(12) United States Patent
Yin et al.

(10) Patent No.: US 8,626,983 B2
(45) Date of Patent: Jan. 7, 2014

(54) MOTHERBOARD FOR SUPPORTING EXPANSION CARD OR SERIAL ADVANCED TECHNOLOGY ATTACHMENT DUAL IN-LINE MEMORY MODULE THROUGH SAME EXPANSION SLOT

(75) Inventors: Xiao-Gang Yin, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 105 days.

(21) Appl. No.: 13/221,916

(22) Filed: Aug. 31, 2011

(65) Prior Publication Data
US 2013/0044424 A1 Feb. 21, 2013

(30) Foreign Application Priority Data
Aug. 17, 2011 (CN) .......................... 2011 1 0236007

(51) Int. Cl.
G06F 13/14 (2006.01)
H05K 7/00 (2006.01)

(52) U.S. Cl.
USPC .......................................... 710/316; 710/301

(58) Field of Classification Search
USPC .................. 710/300–302, 315–317, 305–306
See application file for complete search history.

(56) References Cited

U.S. PATENT DOCUMENTS

| 7,174,407 B2* | 2/2007 | Hou et al. | 710/301 |
| 7,657,665 B2* | 2/2010 | Dalton et al. | 710/5 |
| 2010/0251543 A1* | 10/2010 | Hoang | 29/832 |
| 2012/0260024 A1* | 10/2012 | Haywood | 711/103 |

* cited by examiner

Primary Examiner — Paul R Myers
Assistant Examiner — Trisha Vu
(74) Attorney, Agent, or Firm — Altis Law Group, Inc.

(57) ABSTRACT

A motherboard includes a processor, a platform controller hub (PCH), a switch, a power connector, a switch unit, and an expansion slot. The PCH is connected to the expansion slot to output a bus signal to a serial advanced technology attachment dual in-line memory module (SATA DIMM), which is connected to the expansion slot, in response to the movement of a switch. The processor connected to the processor socket outputs a bus signal to an expansion card, which is connected to the expansion slot, in response to another movement of the switch.

5 Claims, 3 Drawing Sheets

MOTHERBOARD FOR SUPPORTING EXPANSION CARD OR SERIAL ADVANCED TECHNOLOGY ATTACHMENT DUAL IN-LINE MEMORY MODULE THROUGH SAME EXPANSION SLOT

BACKGROUND

1. Technical Field

The present disclosure relates to a motherboard.

2. Description of Related Art

As users, such as music lovers and photographers, store audio and graphics data on their computer systems, the storage capacity of their hard drive may fill up quickly, as such, users must swap out their current hard drive for a bigger hard drive or must add another hard drive. As game enthusiasts prefers high-quality picture and better sound quality, they connect separate graphics cards and sound cards to expansion slots, such as to peripheral component interconnection (PCI) slots arranged on the motherboard. However, hard drives are difficult to install and game enthusiasts not all make use of all of their computer expansion slots. Therefore, there is room for improvement in the art.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
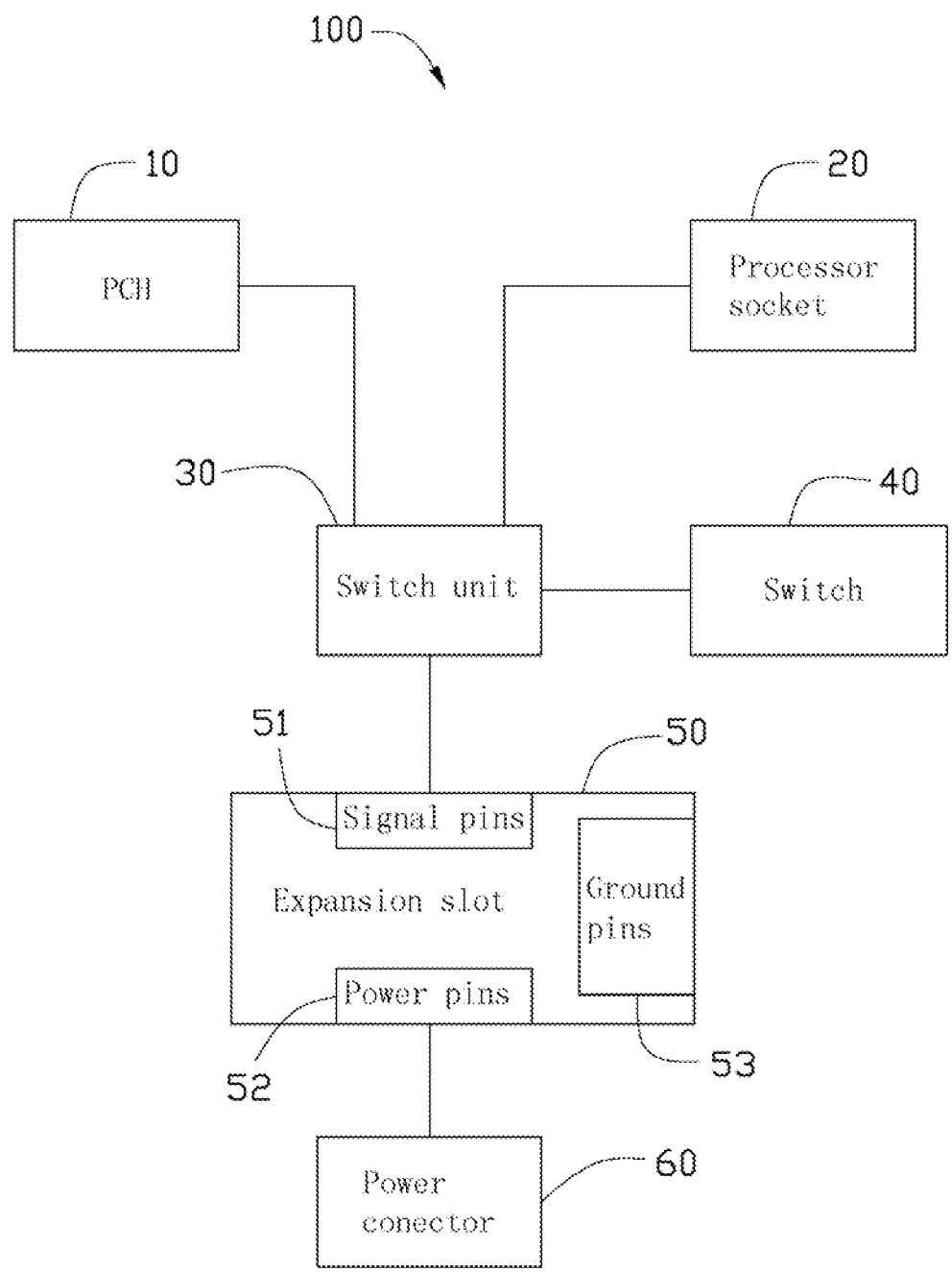
FIG. 1 is a block diagram of a motherboard in accordance with an exemplary embodiment.
Figure 2:
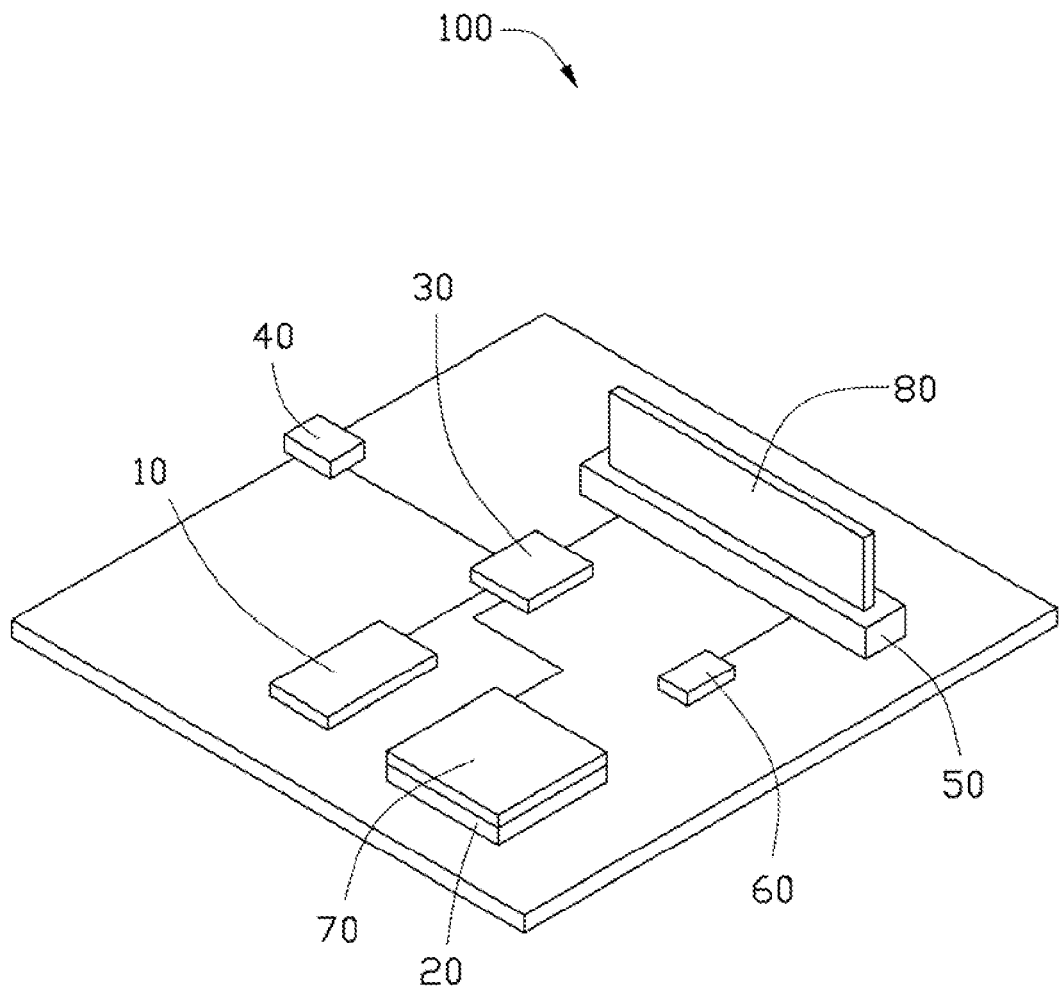
FIG. 2 is an isometric view of the motherboard of FIG. 1 with a central processing unit (CPU) and a serial advanced technology attachment dual in-line memory module (SATA DIMM).
Figure 3:
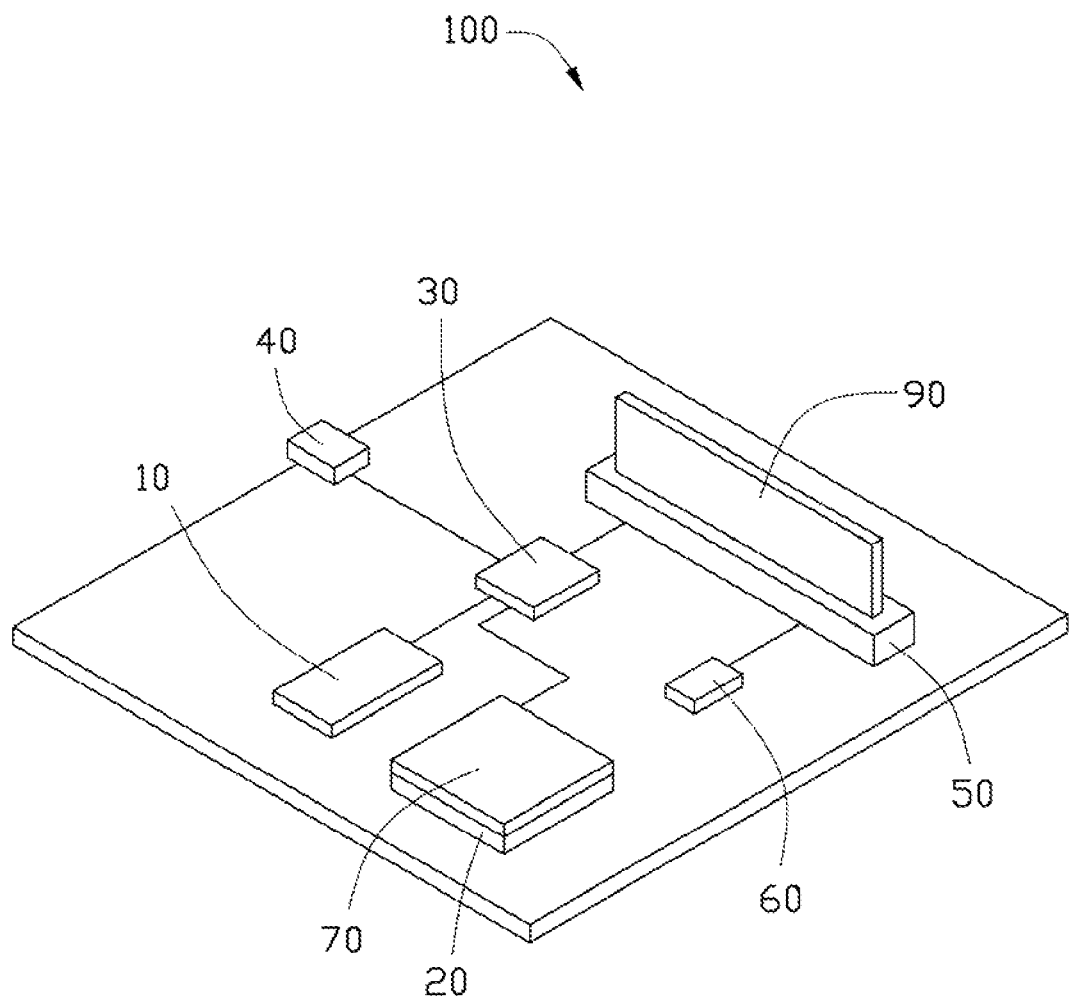
FIG. 3 is an isometric view of the motherboard of FIG. 1 with a central processing unit (CPU) and an expansion card.

Referring to FIGS. 1 and 2, a motherboard 100 in accordance with an exemplary embodiment includes a platform controller hub (PCH) 10, a processor socket 20, a switch unit 30, a switch 40, an expansion slot 50, and a power connector 60. In one embodiment, all the other elements of the motherboard 100 are known elements of a generalized motherboard of a computer. In one embodiment, the expansion slot 50 is a peripheral component interconnection (PCI) slot. The switch unit 30 is a chip.

The expansion slot 50 includes a plurality of power pins 52, a plurality of ground pins 53, and a plurality of signal pins 51. The power pins 52 are connected to the power connector 60, to receive voltage from the power connector 60, and provide the voltage to a serial advanced technology attachment dual in-line memory module (SATA DIMM) 80 or an expansion card 90, which is connected to the expansion slot 50. Through the switch unit 30, the signal pins 51 are connected to the PCH 10 and the processor socket 20. The ground pins 53 are connected to a ground layer (not shown) of the motherboard 100. The user-accessible switch 40 is connected to the switch unit 30. The PCH 10 outputs a particular bus signal, such as a SATA signal to the expansion slot 50 through the switch unit 30, when the expansion slot 50 receives a SATA DIMM 80. The processor socket 20 outputs a different bus signal, such as a PCI signal to the expansion slot 50 through the switch unit 30 when the expansion slot 50 receives an expansion card 90.

The switch 40 generates a first switch signal when the switch 40 is in on state, and the switch 40 generates a second switch signal when the switch 40 is in off state. The first switch signal may be a high level signal (e.g. 3 volts), the second switch signal may be a low level signal (e.g. 0V). In one embodiment, the switch 40 may be a latched (not momentary) toggle switch. In other embodiments, the switch 40 can be a push button. The first switch signal is generated when the switch 40 is moved forward, and the second switch signal is generated when the switch 40 is moved backward.

The switch unit 30 receives a switch signal from the switch 40, and controls the expansion slot 50 to be connected either to the processor socket 20 or to the PCH 10 according to the received switch signal. When the switch unit 30 receives a high level signal, the expansion slot 50 is connected to the PCH 10, to enable communication between the motherboard 100 and the SATA DIMM module 80 in the expansion slot 50. When the switch unit 30 receives a low level signal, the expansion slot 50 is connected to the processor socket 20, to enable communication between the motherboard 100 and the expansion card 90, which is in the expansion slot 50.

In use, when a SATA DIMM module 80 is connected, the power connector 60 outputs a voltage to the SATA DIMM module 80 through the power pins 52 of the expansion slot 50. The switch 40 outputs a high level signal to the switch unit 30 through the switch 40 in an on state. The switch unit 30 connects the expansion slot 50 to the PCH 10. The PCH 10 outputs a bus signal, such as a SATA signal to the SATA DIMM module 80, to enable communication between the motherboard 100 and the SATA DIMM module 80.

When an expansion card 80 is connected to the expansion slot 50, the power connector 60 outputs a voltage to the expansion card 80 through the power pins 52 of the expansion slot 50. The switch 40 outputs a low level signal to the switch unit 30 through the switch 40 in an off state. The switch unit 30 connects the expansion slot 50 to the processor socket 20. A processor 70 mounted on the processor socket 20 outputs a bus signal, such as a PCI signal to the expansion card 90, to enable communication between the motherboard 100 and the expansion card 90.

In other embodiments, the switch unit 30 controls the expansion slot 50 to be connected to the PCH 10 when the switch 40 is outputting a low level signal, and the switch unit 30 controls the expansion slot 50 to be connected to the processor socket 20 when the switch 40 is outputting a high level signal.

The motherboard 100 can communicate either with a SATA DIMM module 80 or with an expansion card 90 in the expansion slot 50, through the control of the switch unit 30 as prompted by the switch signal from the switch 40.

Even though numerous characteristics and advantages of the disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A motherboard comprising:
a processor socket to connect a processor;
a platform controller hub (PCH);
a switch;
a power connector;
a switch unit connected to the switch, to receive a first switch signal or a second switch signal from the switch, and the switch unit is connected to the processor socket and the PCH; and
an expansion slot comprising a plurality power pins connected to the power connector for receiving a voltage, a plurality of ground pins, and a plurality of signal pins connected to the switch unit, wherein the expansion slot is operable to connect either a serial advanced technology attachment dual in-line memory module (SATA DIMM) or an expansion card;
wherein the PCH outputs a bus signal to the SATA DIMM module through the switch unit and the plurality of signal pins of the expansion slot in response to the switch unit receiving the first switch signal from the switch, or the processor connected to the processor socket outputs a bus signal to the expansion card through the switch unit and the plurality of signal pins of the expansion slot in response to the switch unit receiving the second switch signal from the switch.

2. The motherboard of claim 1, wherein the switch is a toggle switch operable with a forward and a backward movement.

3. The motherboard of claim 2, wherein the switch outputs the first switch signal when the toggle switch is moved forward, and the switch outputs the second switch signal when the toggle switch is moved backward.

4. The motherboard of claim 1, wherein the first switch signal is a high level signal, and the second switch signal is a low level signal.

5. The motherboard of claim 1, wherein the expansion slot is a peripheral component interconnection (PCI) slot.

* * * * *